Sept. 3, 1963
E. C. KIEKHAEFER
3,102,799
RESIDENTIAL WATER STORING AND SUPPLY APPARATUS
Filed June 20, 1960
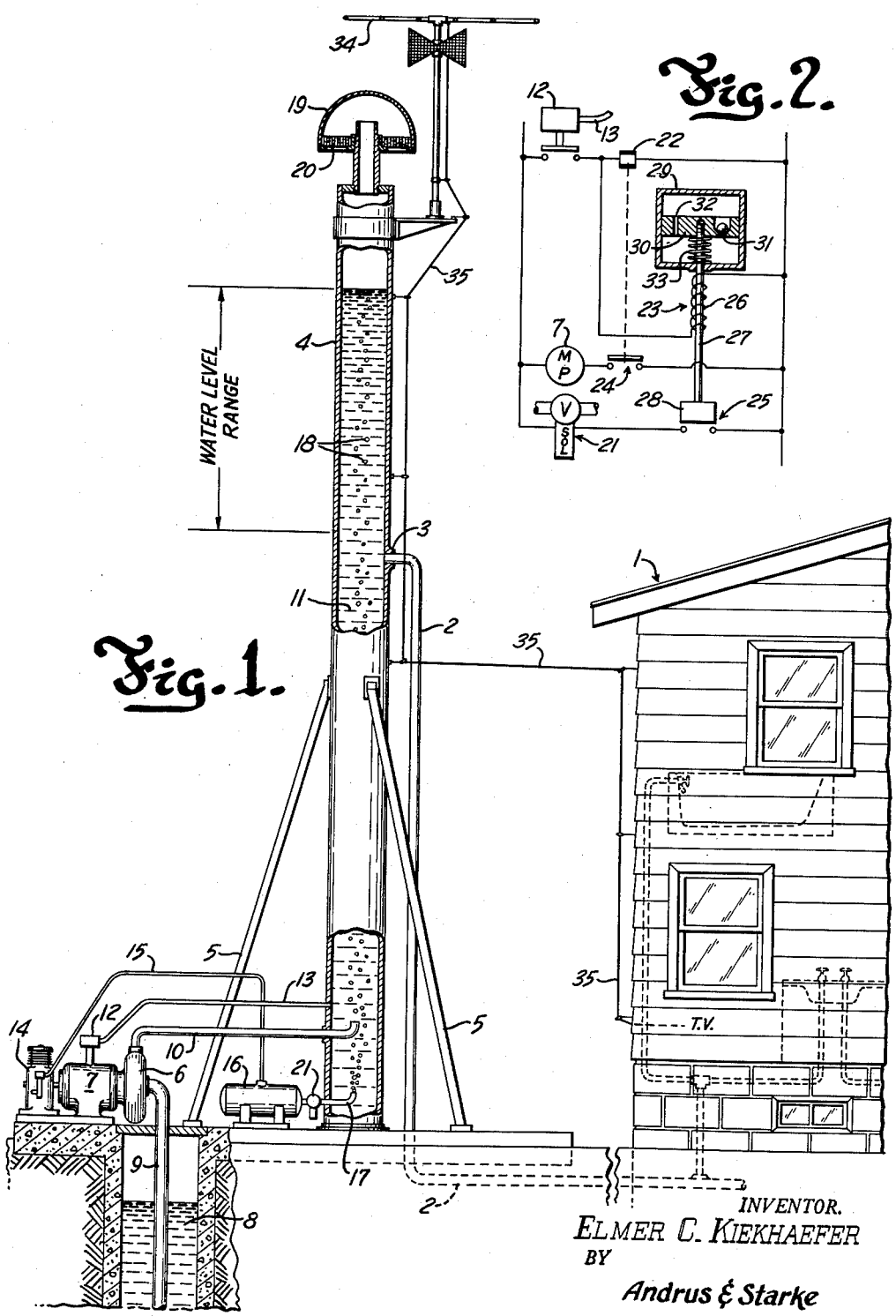
INVENTOR.
ELMER C. KIEKHAEFER
BY
Andrus & Starke
Attorneys

3,102,799
RESIDENTIAL WATER STORING AND SUPPLY APPARATUS
Elmer Carl Kiekhaefer, Cedarburg, Wis.
(2408 Cypress Gardens Road, Winter Haven, Fla.)
Filed June 20, 1960, Ser. No. 37,180
2 Claims. (Cl. 55—227)

This invention relates to a residential water storing and supply apparatus, and more particularly to an improved apparatus for storing and treating water for subsequent residential use.

In many areas of the country, homes are not supplied with water from a central municipal station, but instead are supplied from individual wells located on the home owner's property. In some instances the water from the wells is extremely odoriferous due to the existence of bacteria, sulphur, minerals and other materials therein. These impurities, while usually not harmful to persons using the water, often create an odor which is most unpleasant and may permeate food cooked in the water, clothes washed therein, etc.

The present invention contemplates an apparatus which removes the odors from the water being stored for use, and causes them to be expelled above the residence where they will not be breathed by the property owner. The water is stored in a stand-pipe having controls to maintain the water level within a desired range.

The accompanying drawing illustrates the best mode presently contemplated for carrying out the invention.

In the drawing:

FIGURE 1 is a side elevation of an apparatus constructed in accordance with the invention; and FIG. 2 is a circuit diagram for the electrical control system.

As shown in the drawing, the apparatus of the invention is specifically adapted for use with a multi-story residence structure 1 having the usual water-use facilities, some of which are shown in phantom. A water inlet conduit or pipe 2 is connected at one end to the residence adjacent the foundation. The other end of pipe 2 is joined as by a coupling 3 to the upper wall portion of a vertical stand-pipe 4. Pipe 4 is of relatively large diameter, a one or two foot diameter being found suitable, and the pipe is closed at the bottom end and is supported from the ground by a plurality of braces 5. Stand-pipe 4 extends substantially above the roof of the residence 1, for purposes to be described.

Water is supplied to pipe 4 by a suitable pump 6, operated by a motor 7, which draws water from a well 8 through a pipe 9 and pumps it into pipe 4 through a pipe 10. The inner end of pipe 10 is curved upwardly to discharge water in an upward direction to provide turbulence of the water thereabove, for purposes to be described. The inner end of pipe 10 is disposed substantially below the inlet end of pipe 2.

As pump 6 operates, water 11 rises in stand-pipe 4 until its level is above that of the roof of residence 1 and above coupling 3. This provides a good water head for adequate pressure within the residence at all times.

Pump motor 7 is controlled to turn on and off to maintain the top level of the water above coupling 3, but to prevent it from spilling out the top of pipe 4. This is accomplished by a suitable pump motor switch 12 connected via a tube 13 to standpipe 4, whereby the pressure of water within the tube actuates the switch. Switch 12 may be adjusted in any well-known manner to operate pump 6 within the desired range of water levels and pressures. The inlet of tube 13 into pipe 4 is disposed above pipe 10, but below pipe 2.

It is desirable that the amount of water between the top and bottom levels, as determined by switch 12, is sufficient to provide adequate water for any one usage in the residence. Thus this amount should exceed that utilized by an automatic washer in a full cycle, a bathtub, etc.

In many areas the water obtained from ground sources, such as wells, is highly odoriferous, which may make it unsatisfactory or at least unpleasant, for home use. Such odors can be substantially eliminated by passing a cleansing gas such as air or ozone through the water. For this purpose, a gas compressor 14 is disposed for operation by motor 7 and is provided with a pipe 15 which discharges a suitable cleansing gas into a valved pressure tank 16 and hence through a pipe 17 disposed for discharge of gas upwardly into the water in pipe 4. Pipe 17 is disposed with its discharge opening below inlet pipe 2.

The gas introduced into stand-pipe 4 bubbles upwardly through the water, as shown at 18, and by a process of oxidation, ozonation or the like, removes the source of odors. In many instances, the gas leaves the top surface of water 11 having a distinctive odor itself. It is not desirable therefore for any of the escaping gas to reach persons below. Stand-pipe 4 is therefore of such a height that the odorous gas escaping from the top will be well above roof level and thus normally carried away and dispersed by the wind.

To prevent animals or other contaminants from falling into water 11, a generally dome-shaped cap 19 is threaded onto the open top of stand-pipe 4. Cap 19 is generally hollow, with an annular filter 20 connected to the base portion and disposed around the outside wall of pipe 4. The construction is such that the air leaving pipe 4 passes upwardly and impinges on the concave dome surface of the cap 19 and then passes downwardly through filter 20. Thus nothing can fall into pipe 4 from above.

It is important that any water which enters stand-pipe 4 is cleansed of odors. At the same time, once these odors are removed it is unnecessary to continue the introduction of air into the water. For purposes of control of the odor removal function, means are provided to insure discharge of gas through pipe 17 when fresh water is being pumped from well 8, with a continued discharge of gas for a timed period after pump 6 stops operating.

As shown in FIG. 2, switch 12 is connected in an electrical circuit with the pump motor 7 and a solenoid valve 21 disposed in pipe 17. A pump motor relay 22 and a solenoid valve relay 23 are connected in parallel with each other and in series with the switch 12 across a set of power lines. Closing of switch 12 will simultaneously energize the pump motor relay 22 and the solenoid valve relay 23. Relay 22 will close a contact 24 to start motor 7, and relay 23 will close a contact 25 to open valve 21, whereby pump 6 will discharge water through pipe 10, and valve 21 will discharge gas through pipe 17. Thus both motor 7 and valve 21 will always operate together so that air will always be introduced into stand-pipe 4 when water is being drawn from the well.

In view of the great amount of odoriferous material in many waters, introduction of cleasing gas only while pump 6 is operating has been found insufficient if any large quantity of water is drawn by the residence. Means are therefore provided to maintain discharge of gas through pipe 17 for a timed period after motor 7 is shut off. This is accomplished by making relay 23 a timed relay of any well-known type whereby when relay 23 is de-energized, as by opening of switch 12, contact 25 will remain closed for a timed period sufficient to cleanse all the water in stand-pipe 4. As shown in FIG. 2, relay 23 may comprise a coil 26 having the usual armature 27 therein, with the latter being connected at one end to a relatively thick sliding contact member 28. The other end of armature 27 is disposed within a closed dashpot chamber 29 having oil or other suitable fluid therein. A disk-like piston 30 is attached to armature 27 within chamber 29, with piston 30 having a cage containing a valve therein.

When coil 26 is energized, valve 31 will permit armature 27 to readily and quickly move downwardly so that the inner portion of contact member 28 closes the circuit to open solenoid valve 21. However, when coil 27 is de-energized, valve 31 will close and prevent normal rising of armature 27. Fluid will slowly flow through a small restriction or passage 32 in piston 30 so that armature 27 will gradually rise. However, contact member 28 is of sufficient thickness to maintain contact with contacts 25 so that the solenoid valve circuit will not be broken until the armature 27 has raised sufficiently to clear the contact 25. This will involve a sufficient number of minutes for water 11 to be fully cleansed. A spring 33 or other suitable means may bias piston 30 upwardly.

If desired, a TV or other antenna 34 may be secured to the top portion of pipe 4 with a suitable lead 35 extending between the pipe and residence 1.

The invention provides an all-in-one water storage, treatment and pressure system whereby a sufficient supply of cleansed water under adequate pressure is available at all times. By introducing water from pipe 10 in an upwardly direction, turbulence of substantially all the water in stand-pipe 4 will cause any gas bubbles attached to the pipe walls during periods of non-use to be released. Any odors passing from the structure will not pass near the ground where their presence would be undesirable. The cleansing gas is introduced into water 11 in timed relation with water intake from well 8, and continues to be introduced for a timed period thereafter.

Various modes of carrying out the invention are contemplated as being within the scope of the following claims particularly pointing out and distinctly claiming the subject matter which is regarded as the invention.

I claim:
1. A water supply system for a residence with a water well, comprising, in combination, a narrow stand-pipe disposed adjacent the well and having an open top substantially higher than the roof of the residence, pump means connecting said well with the lower end of said stand-pipe for introduction of water into the latter, pressure-controlled switch means connecting said stand-pipe with said pump means so that the latter will be operated to maintain water in the stand-pipe between two desired levels closely adjacent said open top, a conduit disposed closely adjacent the lower of said two levels and extending within the residence to supply water thereto, means to supply a cleansing gas to the bottom of said stand-pipe so that the gas will bubble up through the water and remove odors therefrom, a dome-shaped cap secured to the open top of said stand-pipe and having an annular filter disposed around the pipe so that gas escaping from the water will be discharged above the roof of the residence and impurities cannot be admitted to the water, said pump means including a conduit which discharges water into said stand-pipe at a point above said gas supplying means and upwardly to produce turbulence in the water so that any gas bubbles clinging to the wall of said stand-pipe will be released, means to operate said gas supplying means simultaneously with said pump means, and means to provide a timed continuation of operation of said gas supplying means after said pump means has ceased operating.

2. A water supply system for a residence with a water well, comprising, in combination, a narrow stand-pipe disposed adjacent the well and having an open top substantially higher than the roof of the residence, pump means connecting said well with the lower end of said stand-pipe for introduction of water into the latter, pressure-controlled switch means connecting said stand-pipe with said pump means so that the latter will be operated to maintain water in the stand-pipe between two desired levels closely adjacent said open top, a conduit disposed closely adjacent the lower of said two levels and extending within the residence to supply water thereto, means to supply a cleansing gas to the bottom of said stand-pipe so that the gas will bubble up through the water and remove odors therefrom, a dome-shaped cap secured to the open top of said stand-pipe and having an annular filter disposed around the pipe so that gas escaping from the water will be discharged above the roof of the residence and impurities cannot be admitted to the water, said pump means including a conduit which discharges water into said stand-pipe at a point above said gas supplying means and upwardly to produce turbulence in the water so that any gas bubbles clinging to the wall of said stand-pipe will be released, and means to operate said gas supplying means simultaneously with said pump means.

References Cited in the file of this patent
UNITED STATES PATENTS

| | | |
|---|---|---|
| 710,325 | Kern et al. | Sept. 30, 1902 |
| 1,084,693 | Cahill | Jan. 20, 1914 |
| 1,872,462 | Johnston et al. | Aug. 16, 1932 |
| 2,577,389 | Warriner | Dec. 4, 1951 |
| 2,610,839 | De Wees | Sept. 16, 1952 |
| 2,811,258 | Schleyer et al. | Oct. 29, 1957 |